United States Patent [19]
Reval

[11] 3,825,817
[45] July 23, 1974

[54] THYRISTOR CHOPPER CIRCUITS

[75] Inventor: Hardev Reval, London, England

[73] Assignee: C.A.V. Limited, Birmingham, England

[22] Filed: July 3, 1973

[21] Appl. No.: 376,157

[30] Foreign Application Priority Data
July 6, 1972    Great Britain.................... 31593/72

[52] U.S. Cl..................... 321/45 C, 321/25, 321/43
[51] Int. Cl. .......................................... H02m 7/52
[58] Field of Search .................................. 321/45 C

[56] References Cited
UNITED STATES PATENTS
3,621,366   11/1971   Duff et al......................... 321/45 C
3,667,021   5/1972   Anderson......................... 321/45 C

*Primary Examiner*—William M. Shoop, Jr.
*Attorney, Agent, or Firm*—Holman & Stern

[57] ABSTRACT

A thyristor chopper circuit has a main thyristor for supplying current to a load and a commutating capacitor for turning the main thyristor off. The capacitor is charged by a saturating transformer when the main thyristor conducts, the primary winding of the saturating transformer being connected in series with the main thyristor, and current limiting means being provided for restricting the maximum mean current flow through the main thyristor, the current limiting means being responsive to the time taken for the transformer to saturate.

3 Claims, 1 Drawing Figure

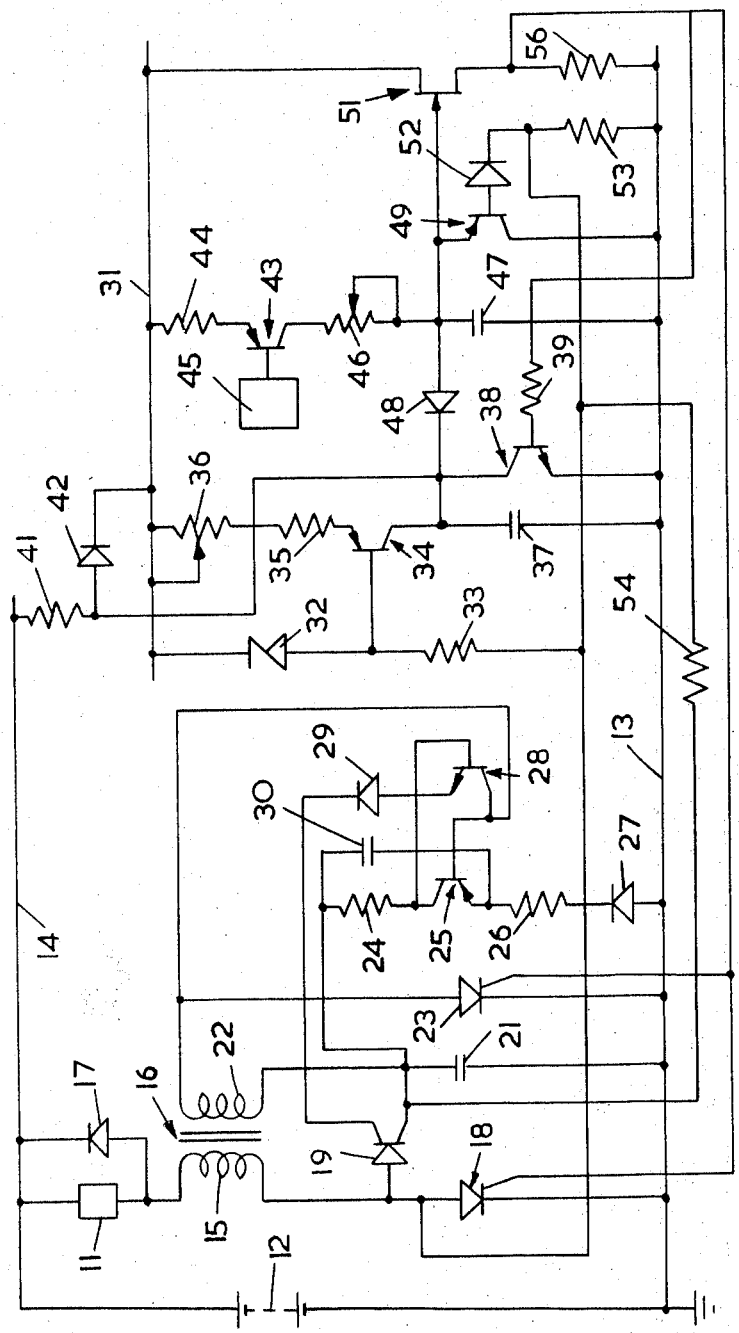

THYRISTOR CHOPPER CIRCUITS

This invention relates to thyristor chopper circuits.

A circuit according to the invention includes a main thyristor for supplying current to a load, a commutating capacitor for turning the main thyristor off, a saturating transformer for charging the capacitor when the main thyristor conducts, the primary winding of the saturating transformer being connected in series with the main thyristor, and current limiting means for restricting the maximum mean current flow through the main thyristor, said current limiting means being responsive to the time taken for the transformer to saturate.

In one arrangement, the circuit includes means for commutating the main thyristor to turn it off when the transformer saturates, the mean current flow through the load being controlled by varying the off time of the main thyristor. In such an arrangement, the current limiting means can operate by measuring the on time of the main thyristor.

The accompanying drawing is a circuit diagram illustrating one example of the invention.

Referring to the drawing the circuit is used to control a traction motor 11 on a road vehicle powered by a battery 12. The battery has its negative terminal connected to a supply line 13 and its positive terminal connected to a supply line 14. The motor 11 being connected between the line 14 at one end of the primary winding 15 of a saturating transformer 16. The motor 11 is bridged by a free wheel diode 17, and the winding 15 has its other end connected through the anode-cathode path of a main thyristor 18 to the line 13. The anode-cathode of the thyristor 18 are bridged by a series circuit including the anode-cathode path of a thyristor 19 and a capacitor 21, and the junction of the thyristor 19 and capacitor 21 is connected to the line 13 through a series circuit including the secondary winding 22 of the transformer 16 and the anode-cathode path of a third thyristor 23. The cathode of the thyristor 19 is further connected through a resistor 24 to the collector of a p-n-p transistor 25, the emitter of which is connected to the line 13 through a resistor 26 and a diode 27 in series. The emitter of the transistor 25 is further connected to the cathode of the thyristor 19 through a capacitor 30, whilst the base of the transistor 25 is connected to the collector of an n-p-n transistor 28, the emitter of which is connected to the gate of the thyristor 19 through a diode 29, and the base of which is connected to the collector of the transistor 25. The collector of the transistor 28 is connected through a resistor to the anode of the thyristor 23.

In order to understand the operation of this part of the circuit, imagine a point in a cycle at which the thyristors 18 and 23 are off, but the thyristor 19 is conducting. Current flows through the motor 11 and the winding 15, and thence through the thyristor 19 to charge the capacitor 21 to a voltage in excess of the voltage of the battery 12. When the capacitor 21 has charged, the thyristor 19 turns off. At some point in the cycle, a positive pulse is applied to the gates of the thyristors 18 and 23. Conduction of the thyristor 18 causes current to flow in the load 11, and conduction of the thyristor 23 causes the voltage on the capacitor 21 to reverse. When the capacitor voltage has reversed, the thyristor 23 is reverse biased, and turns off.

As a result of conduction of the thyristor 18, an increasing current flows in the winding 15, and the capacitor 21 is reverse charged by the secondary winding 22. When the transformer 16 saturates, the voltage developed in the winding 22 turns on the transistor 25, which in turn turns on the transistor 28. Conduction of the transistor 28 results in a pulse being applied to the gate of the thyristor 19 to turn the thyristor 19 on, the length of the pulse being determined by the capacitor 30. The negative charge on the capacitor 21 is now applied to the thyristor 18 to turn off the thyristor 18, after which the capacitor starts to charge again through the thyristor 19 and the cycle is repeated. A pulse to turn the thyristor 19 on is always provided as soon as the transformer 16 saturates, and the mean current flow in the load is controlled by varying the off time of the thyristor 18.

The circuit further includes a positive supply line 31 which receives a stabilised supply derived from the battery 12. The line 31 is connected to the anode of the thyristor 18 through a Zener diode 32 and a resistor 33 in series, the junction of the Zener diode 32 and resistor 31 being connected to the base of a p-n-p transistor 34, the emitter of which is connected to the line 31 through a resistor 35 and a variable resistor 36 in series. The collector of the transistor is connected to the line 13 through a capacitor 37, and is further connected to the collector of an n-p-n transistor 38 having its emitter connected to the line 13. The collector of the transistor 38 is further connected through a resistor 41 to the line 14 and through a diode 42 to the line 31.

The circuit further includes a p-n-p transistor 43 the emitter of which is connected to the line 31 through a resistor 44 and the base of which is connected to manually operable control means 45 for determining the off time of the thyristor 18. The collector of the transistor 43 is connected to the line 13 through a variable resistor 46 and the capacitor 47 in series, the junction of the resistor 46 and the capacitor 47 being connected through a diode 48 to the collector of the transistor 38, and being further connected to the emitter of a p-n-p transistor 49, and also to the emitter of a unijunction transistor 51. The transistor 49 has its collector connected to the line 13 and its base connected to the anode of a diode 52, the cathode of which is connected through a resistor 53 to the line 13, through a resistor 54 to the cathode of the thyristor 19, and through a diode 55 to the anode of the thyristor 18. The transistor 51 has its primary base connected to the line 31 and its secondary base connected to the gates of the thyristors 18, 23, through a resistor 56 to the line 13, and through a resistor 39 to the base of the transistor 38.

The control means 45, which is linked to the accelerator pedal of the truck driven by the motor 11, produces a current dependent upon the position of the accelerator pedal, and so the transistor 43 conducts a current determined by the control means 45. Ignoring for the moment the transistor 49, then the capacitor 47 charges until the transistor 51 breaks down, at which point pulses are applied to the gates of the thyristors 18 and 23 to turn them on. The time taken for the capacitor 47 to charge sufficiently is of course dependent on the current flowing through the transistor 43, and the resistor 46 is provided to limit the maximum pulse rate.

The transistor 49 ensures that the capacitor 47 only starts to charge at the instant when the thyristor 18 turns off. The transistor 49 is normally conducting, but as soon as the thyristor 18 turns off, then by virtue of the connection between the anode of the thyristor 18 and the base of the transistor 49 by way of the diode 55, the transistor 49 will turn off, so that the capacitor 47 starts charging. Moreover, when the thyristor 18 turns off, the capacitor 21 starts to charge as previously explained, and when the voltage across the capacitor 21 exceeds the battery voltage, then by virtue of the connection by way of the resistor 54 from the cathode of the thyristor 19 to the base of the transistor 49, the transistor 49 will be held off as long as the capacitor voltage exceeds battery voltage. When the transistor 51 fires, the capacitor 21 reverses its charge by virtue of conduction of the thyristor 23, and so the transistor 49 is no longer held off, and the capacitor 47 discharges through the transistor 49. The transistor 51 turns off as soon as the capacitor 47 has discharged.

The circuit includes current limiting means which will now be described. This current limiting means acts to restrict the maximum mean current flowing through the main thyristor, and is sensitive to the time taken for the transformer to saturate. The current limiting means acts through the normal commutating circuit by causing the commutating capacitor 21 to turn off the main thyristor 18 if the predetermined mean current level is exceeded.

When the transistor 51 fires, a pulse is also applied by way of the resistor 39 to the transistor 38, turning the transistor 38 on momentarily to discharge the capacitor 37. As long as the thyristor 18 is off, the potential at its anode holds off the transistor 34, but when the thyristor 18 conducts, the potential at its anode falls, and the transistor 34 turns on so that the capacitor 37 charges. The voltage to which the capacitor 37 charges depends on the period of time for which the thyristor 18 conducts, and as previously explained, the thyristor 18 is turned off as soon as the transformer saturates. The time for the transformer to saturate is inversely related to the current flowing through the thyristor 18, and so the larger the current, the shorter the time for which the capacitor 37 charges, and the smaller the voltage across the capacitor 37 when the thyristor 18 is turned off. Provided that the current flow through the thyristor 18 is below a predetermined level, then the thyristor 18 remains on for sufficiently long for the capacitor 37 to develop a voltage which is in excess of the voltage required to fire the transistor 51. The voltage across the capacitor 37 does not of course fire the transistor 51, because the diode 48 prevents this from happening. However, when the thyristor 18 turns off, the voltage is retained on the capacitor 37 even though the transistor 34 turns off. The capacitor 47 is now charged by the transistor 43 as previously explained but since the capacitor 47 will never develop a voltage in excess of the voltage on the capacitor 37, the diode 48 will remain reverse biased, and the capacitor 37 will play no part in the operation of the circuit. The capacitor 47 continues to charge until the transistor 51 is fired, at which point the transistor 38 is turned on to discharge the capacitor 37 and the cycle is repeated.

If the current flowing through the thyristor 18 is above the predetermined level, then the time for which the transistor 34 conducts is very much shorter, because the transformer 16 saturates more quickly. In these circumstances, the capacitor 37 charges to a voltage which is less than the voltage required to fire the thyristor 51. The voltage is again retained on the capacitor 37 when the transistor 34 turns off, but now when the transistor 43 charges the capacitor 47, the capacitor 47 will reach the voltage of the capacitor 37 before the transistor 51 fires, and thereafter the transistor 43 will require to charge the capacitor 47, and also to charge the capacitor 37 by way of the diode 48. For this reason, the time taken to fire the transistor 51 will increase, and so the off period of the thyristor 18 is increased so that the mean current flowing through it is reduced until the predetermined level is no longer exceeded.

The resistor 41 is provided to sense the battery voltage, and automatically reduce the predetermined current level when the battery voltage is high. This arrangement is desirable where the circuit can operate at different battery voltages.

I claim:

1. A thyristor chopper circuit including a main thyristor for supplying current to a load, a commutating capacitor, switch means in circuit with said commutating capacitor, a firing circuit for turning the main thyristor and switch means on, a saturating transformer for charging the capacitor when the main thyristor conducts, the primary winding of the saturating transformer being connected in series with the main thyristor, said switch means when turned on discharging said capacitor to turn said main thyristor off, and current limiting means acting by way of said firing circuit for restricting the maximum mean current flow through the main thyristor, said current limiting means being responsive to the time taken for the transformer to saturate.

2. A circuit as claimed in claim 1 in which said current limiting means serves to turn said switch means on, so commutating the main thyristor to turn it off, when the transformer saturates, the mean current flow through the load being controlled by varying the off time of the main thyristor.

3. A circuit as claimed in claim 2 in which the current limiting means operates by measuring the on time of the main thyristor.

* * * * *